(12) United States Patent
Masuda et al.

(10) Patent No.: US 8,053,992 B2
(45) Date of Patent: Nov. 8, 2011

(54) PLASMA REACTOR AND PLASMA REACTION APPARATUS

(75) Inventors: Masaaki Masuda, Nagoya (JP); Michio Takahashi, Nagoya (JP); Hiroshi Mizuno, Kagamihara (JP)

(73) Assignee: NGK Insulators, Ltd., Nagoya (JP)

( * ) Notice: Subject to any disclaimer, the term of this patent is extended or adjusted under 35 U.S.C. 154(b) by 517 days.

(21) Appl. No.: 12/368,671

(22) Filed: Feb. 10, 2009

(65) Prior Publication Data
US 2009/0206757 A1 Aug. 20, 2009

(30) Foreign Application Priority Data

Feb. 14, 2008 (JP) ................................. 2008-033458

(51) Int. Cl.
*H01J 37/02* (2006.01)
(52) U.S. Cl. .................................. 315/111.21; 422/200
(58) Field of Classification Search ............. 315/111.21, 315/111.31, 111.41, 111.71; 422/200, 312
See application file for complete search history.

(56) References Cited

U.S. PATENT DOCUMENTS

| | | | |
|---|---|---|---|
| 4,101,287 A * | 7/1978 | Sweed et al. .................. | 422/200 |
| 7,131,264 B2 | 11/2006 | Weissman et al. | |
| 7,240,483 B2 | 7/2007 | Cizeron et al. | |
| 2007/0258871 A1 | 11/2007 | Sakurai et al. | |
| 2010/0111781 A1 * | 5/2010 | Takahashi et al. ........ | 422/186.21 |
| 2010/0135870 A1 * | 6/2010 | Mizuno et al. ................ | 422/199 |
| 2010/0329940 A1 * | 12/2010 | Takahashi et al. ....... | 422/186.04 |

FOREIGN PATENT DOCUMENTS

| | | |
|---|---|---|
| EP | 1 840 938 A1 | 10/2007 |
| JP | A-2006-265008 | 10/2006 |

OTHER PUBLICATIONS

U.S. Appl. No. 12/368,701, in the name of Masuda et al., filed on Feb. 10, 2009.
Extended European Search Report for European Application No. 09250330.9, mailed on Apr. 27, 2010.

* cited by examiner

*Primary Examiner* — Don Le
(74) *Attorney, Agent, or Firm* — Oliff & Berridge, PLC

(57) ABSTRACT

A plasma reactor includes a honeycomb electrode in which a plurality of cells that function as gas passages are partitioned by a partition wall, and a discharge electrode. The honeycomb electrode includes a first gas circulation section that allows a first gas to pass through, and a second gas circulation section that allows a second gas to pass through. The plasma reactor causes the first gas introduced into the first gas circulation section of the honeycomb electrode through the space between the electrodes to undergo a reaction while causing a plasma discharge between the honeycomb electrode and the discharge electrode, and allows the second gas to be introduced into the second gas circulation section of the honeycomb electrode to transfer heat of the second gas to the first gas circulation section to promote the reaction of the first gas.

19 Claims, 8 Drawing Sheets

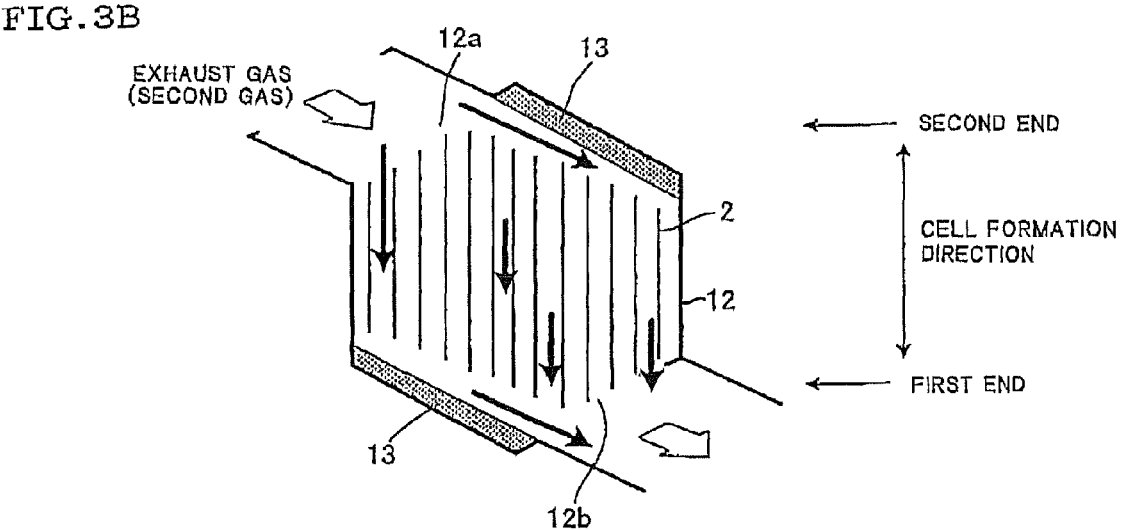
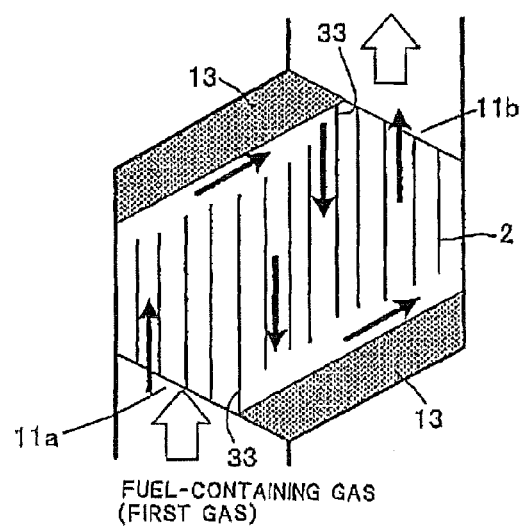

FIG.10A
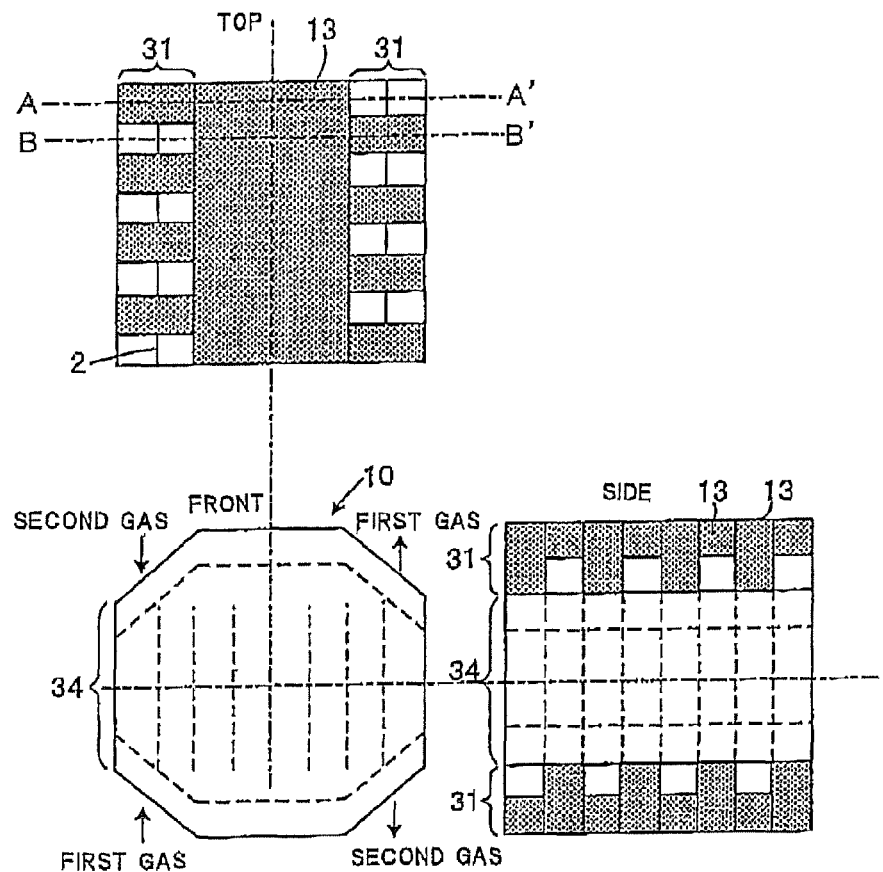
FIG.10B
CROSS-SECTIONAL VIEW
ALONG LINE A-A'
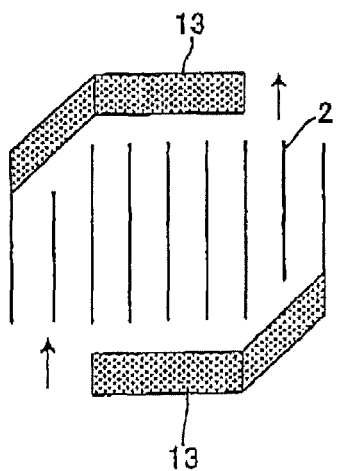
CROSS-SECTIONAL VIEW
ALONG LINE B-B'
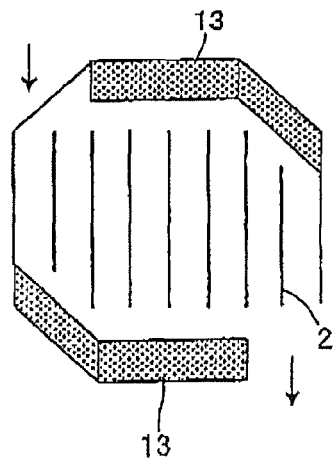

PLASMA REACTOR AND PLASMA REACTION APPARATUS

BACKGROUND OF THE INVENTION

1. Field of the Invention

The present invention relates to a plasma reactor that includes a reaction section that allows gas introduced into a honeycomb structure to undergo a reaction by generating plasma, and a heat-supplying gas circulation section, and a plasma reaction apparatus.

2. Description of Related Art

A silent discharge occurs when disposing a dielectric between a pair of tabular electrodes and applying a high alternating-current voltage or a periodic pulse voltage between the electrodes. Active species, radicals, and ions are produced in the resulting plasma field to promote a reaction and decomposition of gas. This phenomenon may be utilized to remove toxic components contained in engine exhaust gas or incinerator exhaust gas.

Technology that mixes hydrocarbon fuel and air, reforms the mixture using a catalyst, and supplies a reformed gas containing hydrogen to an internal combustion engine has been known (see JP-A-2006-265008, U.S. Pat. No. 7,131,264, and U.S. Pat. No. 7,240,483). Combustion that occurs in the internal combustion engine is promoted by utilizing a reformed gas containing hydrogen so that exhaust gas can be reduced.

SUMMARY OF THE INVENTION

When processing gas using a catalyst, it is necessary to heat the processing target gas to 800 to 900° C. in order to activate the catalyst. The catalyst quickly deteriorates when the processing target gas is heated to such a high temperature. This makes it necessary to use a large amount of expensive precious metal catalyst having high heat resistance.

Therefore, technology that more efficiently produces gas by utilizing a plasma reaction, a catalytic reaction, and the like has been desired. An object of the present invention is to provide a plasma reactor that can efficiently process gas by utilizing plasma, and a plasma reaction apparatus.

The inventor of the present invention found that a reaction of a first gas can be promoted by utilizing heat of a second gas by providing a honeycomb electrode that includes a first gas circulation section that allows the first gas to pass through and a second gas circulation section that allows the second gas to pass through together with a discharge electrode. Specifically, the present invention provides the following plasma reactor and plasma reaction apparatus.

[1] A plasma reactor comprising: a honeycomb electrode that is formed of a conductive material and functions as an electrode, a plurality of cells that function as gas passages and are partitioned by a partition wall being formed in the honeycomb electrode, the plurality of cells forming a first gas circulation section that allows a first gas to pass through, and a second gas circulation section that allows a second gas to pass through to supply heat of the second gas to the first gas circulation section to promote a reaction of the first gas; and a discharge electrode that is disposed to face the honeycomb electrode, a plasma discharge occurring between the discharge electrode and the honeycomb electrode so that the first gas undergoes a reaction, the first gas introduced into the first gas circulation section of the honeycomb electrode from a space between the discharge electrode and the honeycomb electrode being reacted by causing a plasma discharge between the honeycomb electrode and the discharge electrode, and the second gas being introduced into the second gas circulation section of the honeycomb electrode to transfer heat of the second gas to the first gas circulation section to promote the reaction of the first gas.

[2] The plasma reactor according to [1], wherein a discharge end of the discharge electrode is in the shape of a needle or a rod.

[3] The plasma reactor according to [1] or [2], wherein the conductive material that forms the honeycomb electrode includes a conductive ceramic.

[4] The plasma reactor according to [3], wherein the conductive ceramic is a metal-ceramic composite material.

[5] The plasma reactor according to [3] or [4], wherein the conductive ceramic includes silicon carbide.

[6] The plasma reactor according to any one of [1] to [5], wherein the honeycomb electrode has a thermal conductivity of 10 to 300 W/mK.

[7] The plasma reactor according to any one of [1] to [6], wherein the first gas circulation section corresponds to a first cell row formed by a plurality of cells arranged in one direction, the second gas circulation section corresponds to a second cell row formed by a plurality of cells arranged in parallel to the first cell row, and the first gas circulation section and the second gas circulation section are alternately provided by the cell rows.

[8] The plasma reactor according to any one of [1] to [7], wherein: a gas inlet of the first gas circulation section is provided on a first end of the honeycomb electrode on the side of the discharge electrode in a cell extending direction, and a gas outlet of the first gas circulation section is provided on a second end of the honeycomb electrode opposite to the side of the discharge electrode in the cell extending direction; and a gas inlet of the second gas circulation section is provided on the second end of the honeycomb electrode, and a gas outlet of the second gas circulation section is provided on the first end of the honeycomb electrode.

[9] The plasma reactor according to [8], wherein: the gas inlet of the first gas circulation section and the gas inlet of the second gas circulation section are provided at opposed positions in the cell extending direction; the gas outlet of the first gas circulation section and the gas outlet of the second gas circulation section are provided at opposed positions in the cell extending direction and the first gas and the second gas crossed and circulated through different cell rows.

[10] The plasma reactor according to [8] or [9], wherein: a given area of the first cell row on the first end is plugged to form the gas inlet in the remaining area, and an area of the second end opposed to the remaining area of the first end is plugged to form the gas outlet in an area opposed to the given area of the first end; and a given area of the second cell row on the second end is plugged to form the gas inlet in the remaining area, and an area of the first end opposite to the remaining area of the second end is plugged to form the gas outlet in an area opposed to the given area of the second end.

[11] The plasma reactor according to [10], wherein an end of the partition wall of the cell in the plugged area is removed to a large extent as compared with the partition wall of the cell in the unplugged area so that a gas circulation section is formed between the removed partition wall and a plugging section formed to be plugged.

[12] The plasma reactor according to [11], wherein a joint is formed between the plugging section and the partition wall so that a gas flow direction is caused to meander to increase a length of a gas circulation path.

[13] The plasma reactor according to any one of [1] to [12], wherein a catalyst is supported on the first gas circulation section of the honeycomb electrode.

[14] The plasma reactor according to any one of [1] to [13], wherein a catalyst is supported on the second gas circulation section of the honeycomb electrode.

[15] The plasma reactor according to [13] or [14], wherein the catalyst is a substance that contains at least one element selected from the group consisting of a precious metal, aluminum, nickel, zirconium, titanium, cerium, cobalt, manganese, zinc, copper, tin, iron, niobium, magnesium, lanthanum, samarium, bismuth, and barium.

[16] The plasma reactor according to [15], wherein the precious metal is a substance that contains at least one element selected from the group consisting of platinum, rhodium, palladium, ruthenium, indium, silver, and gold.

[17] A plasma reaction apparatus comprising the plasma reactor according to any one of [1] to [16], and a pulse power supply that allows a pulse half-value width to be controlled to 1 microsecond or less.

Since the plasma reactor according to the present invention includes the honeycomb electrode that includes the first gas circulation section that allows the first gas to pass through and the second gas circulation section that allows the second gas to pass through, and a discharge electrode that is disposed to face the honeycomb electrode and allows a plasma discharge to occur between the discharge electrode and the honeycomb electrode so that the first gas undergoes a reaction, the first gas can be introduced into the first gas circulation section of the honeycomb electrode through the space between the electrodes to undergo a reaction while causing a plasma discharge between the honeycomb electrode and the discharge electrode, and the second gas can be introduced into the second gas circulation section of the honeycomb electrode to transfer heat of the second gas to the first gas circulation section to promote the reaction of the first gas. Moreover, the reaction temperature can be reduced so that catalyst deterioration can be suppressed.

BRIEF DESCRIPTION OF THE DRAWINGS

FIG. 3B is a schematic cross-sectional view showing a second gas circulation section.

FIG. 4A is a schematic cross-sectional view showing a first gas circulation section according to another embodiment.

FIG. 10A is a view showing the front, the side, and the top of a honeycomb electrode having an octagonal cross-sectional shape, and FIG. 10B is a cross-sectional view showing a honeycomb electrode having an octagonal cross-sectional shape.

DESCRIPTION OF PREFERRED EMBODIMENTS

Embodiments of the present invention are described below with reference to the drawings. Note that the present invention is not limited to the following embodiments. Various alterations, modifications, and improvements may be made without departing from the scope of the present invention.

Figure 1:
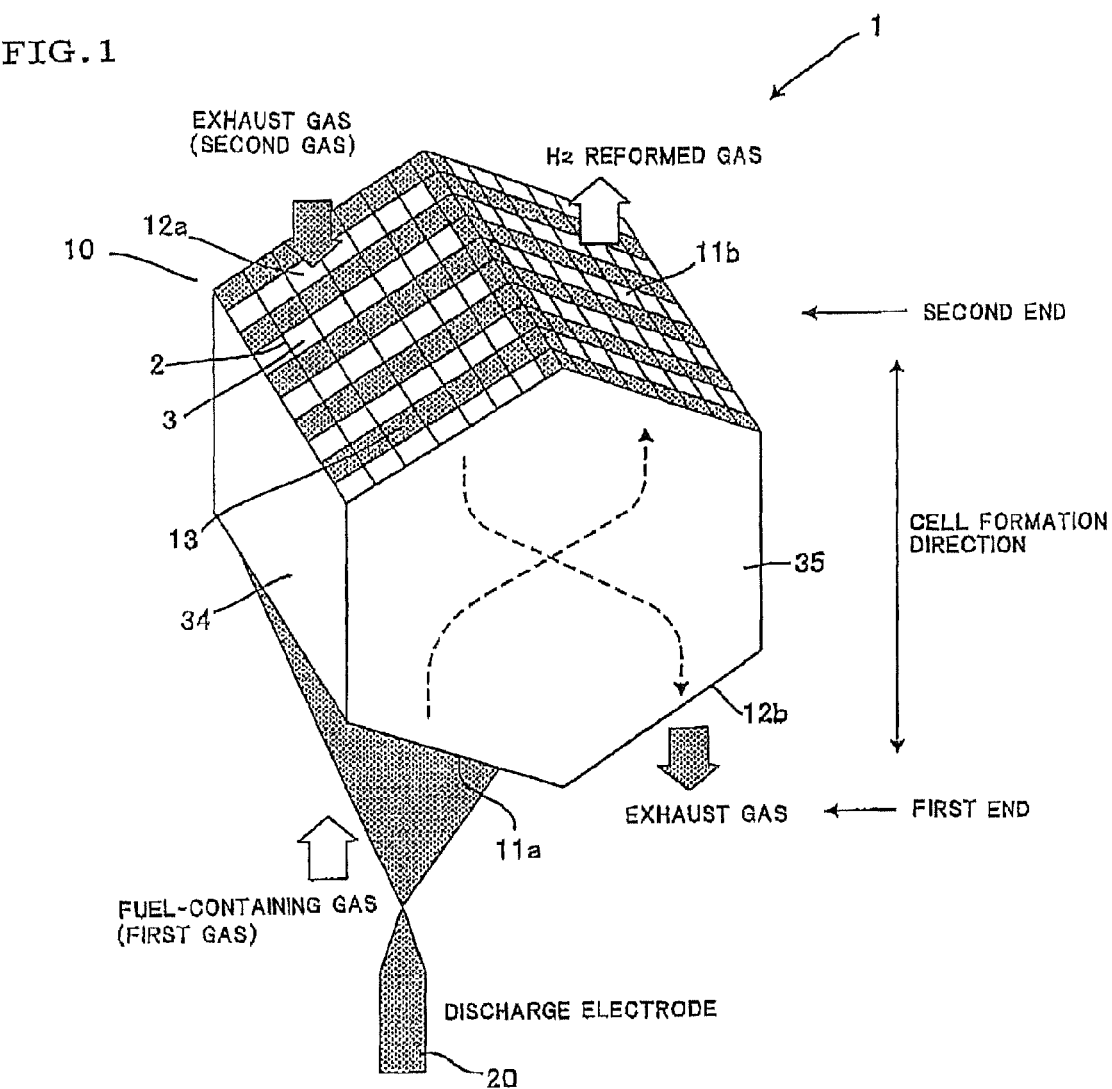
FIG. 1 is a schematic view showing one embodiment of a plasma reactor according to the present invention.

FIG. 1 is a schematic view showing a plasma reactor 1 according to the present invention. The plasma reactor 1 includes a honeycomb electrode 10 that functions as an electrode and has a plurality of cells 3 (gas passages) partitioned by a partition wall 2, and a discharge electrode 20 that is disposed to face the honeycomb electrode 10 and allows a first gas to undergo a reaction due to a discharge that occurs between the discharge electrode 20 and the honeycomb electrode 10. The honeycomb electrode 10 shown in FIG. 1 has a hexagonal shape. Note that the honeycomb electrode 10 may have an octagonal shape (see FIGS. 10A and 10B) insofar as the honeycomb electrode 10 includes a first gas circulation section and a second gas circulation section. In FIG. 1, a first gas circulation section 11 and a second gas circulation section 12 are alternately formed at intervals of one cell row. Note that it suffices that the first gas circulation section 11 and the second gas circulation section 12 be alternately formed at intervals of one or more cell rows. It is desirable to reduce the number of cell rows in order to efficiently transfer heat of a second gas (exhaust gas) to the first gas (fuel-containing gas). On the other hand, since it is effective to increase the cell density in order to improve the catalyst reactivity, it is desirable to reduce the cell pitch. The process cost increases when processing each row at a short cell pitch. Therefore, when the cells are small, it may be economical to form the first gas circulation section and the second gas circulation section at intervals of a plurality of cell rows.

In the honeycomb electrode 10, the cells 3 form the first gas circulation section 11 that allows the first gas to pass through, and the second gas circulation section 12 that allows the second gas to pass through to supply heat of the second gas to the first gas circulation section 11 to promote a reaction of the first gas. The honeycomb electrode 10 is formed of a conductive ceramic and functions as an electrode.

The plasma reactor 1 causes the first gas introduced into the first gas circulation section 11 of the honeycomb electrode 10 through the space between the electrodes to undergo a reaction while causing a plasma discharge between the honeycomb electrode 10 and the discharge electrode 20, and allows the second gas to be introduced into the second gas circulation section 12 of the honeycomb electrode 10 to transfer heat of the second gas to the first gas circulation section 11 to promote the reaction of the first gas.

Figure 2:
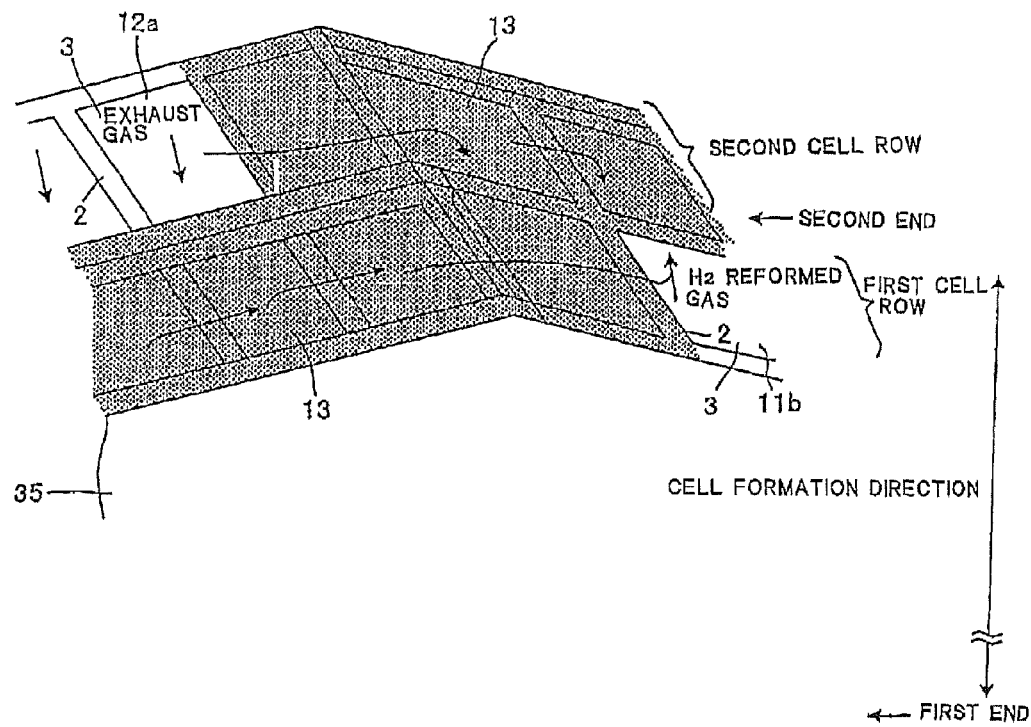
FIG. 2 is a partially enlarged schematic view showing a second end side of a honeycomb electrode.
Figure 3A:
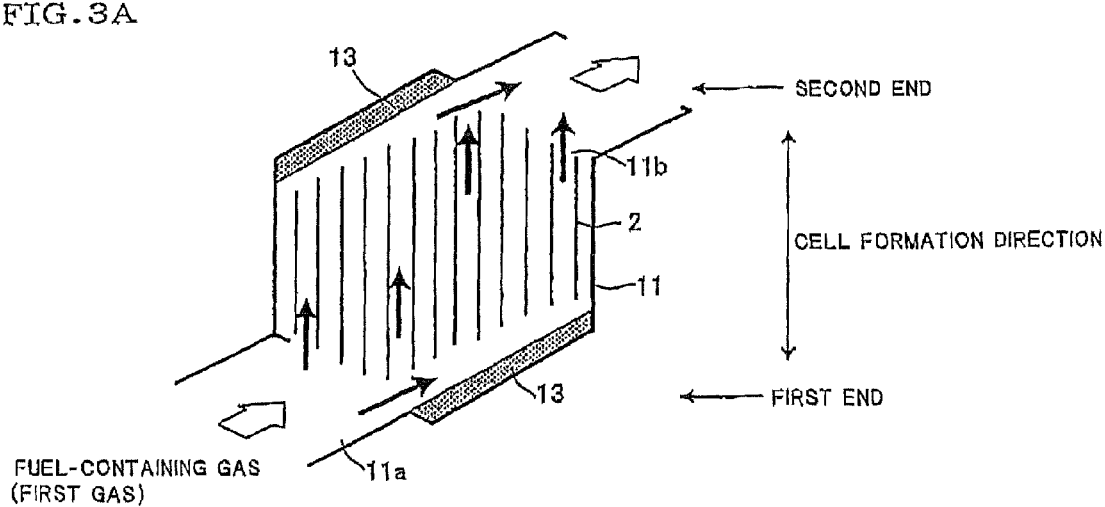
FIG. 3A is a schematic cross-sectional view showing a first gas circulation section.

FIG. 2 is a partially enlarged schematic view showing a second end side of the honeycomb electrode 10 opposite to the side of the discharge electrode of the cell extending direction. A gas outlet 11b of the first gas circulation section 11 and a gas inlet 12a of the second gas circulation section 12 are provided on the second end. FIG. 3A is a cross-sectional view showing the first gas circulation section 11, and FIG. 3B is a cross-sectional view showing the second gas circulation section 12.

The honeycomb electrode 10 is formed so that a plurality of cells 3 are formed through the honeycomb electrode 10 from a first end side to the second end side in every direction. The first gas circulation section 11 is formed by a first cell row that is formed by a plurality of cells 3 arranged in one direction, and the second gas circulation section 12 is formed by a second cell row that is formed by a plurality of cells 3 arranged in parallel to the first cell row. The first gas circulation section 11 and the second gas circulation section 12 are alternately formed by the cell rows. Since the first gas circulation section 11 and the second gas circulation section 12 are alternately formed, heat of the second gas that passes through the second gas circulation section 12 can be effectively transmitted to the first gas circulation section 11 so that the reaction of the first gas can be promoted.

A gas inlet 11a of the first gas circulation section 11 is provided on the first end of the honeycomb electrode 10 on the side of the discharge electrode in the cell extending direction, and the gas outlet 11b of the first gas circulation section 11 is provided on the second end of the honeycomb electrode 10 opposite to the side of the discharge electrode of the cell extending direction. The gas inlet 12a of the second gas circulation section 12 is provided on the second end of the honeycomb electrode 10, and the gas outlet 12b of the second gas circulation section 12 is provided on the first end of the honeycomb electrode 10.

The gas inlet 11a of the first gas circulation section 11 and the gas inlet 12a of the second gas circulation section 12 are provided at opposite positions in the cell extending direction, and the gas outlet 11b of the first gas circulation section 11 and the gas outlet 12b of the second gas circulation section 12 are provided at opposite positions in the cell extending direction. Specifically, the first gas and the second gas cross and circulate in cell rows.

As the cross-sectional schematic view showing the first cell row (first gas circulation section 11) shown in FIG. 3A, a plugging section 13 is formed to plug a given area of the first end of the first cell row, and the remaining area corresponds to the gas inlet 11a. A plugging section 13 is formed to plug an area of the second end opposite to the remaining area of the first end, and an area of the second end opposite to the given area of the first end corresponds to the gas outlet 11b. As the cross-sectional schematic view showing the second cell row (second gas circulation section 12) shown in FIG. 3B, a plugging section 13 is formed to plug a given area of the second end of the second cell row, and the remaining area corresponds to the gas inlet 12a. A plugging section 13 is formed to plug an area of the first end opposite to the remaining area of the second end, and an area opposite to the given area of the second end corresponds to the gas outlet 12b.

Figure 6:
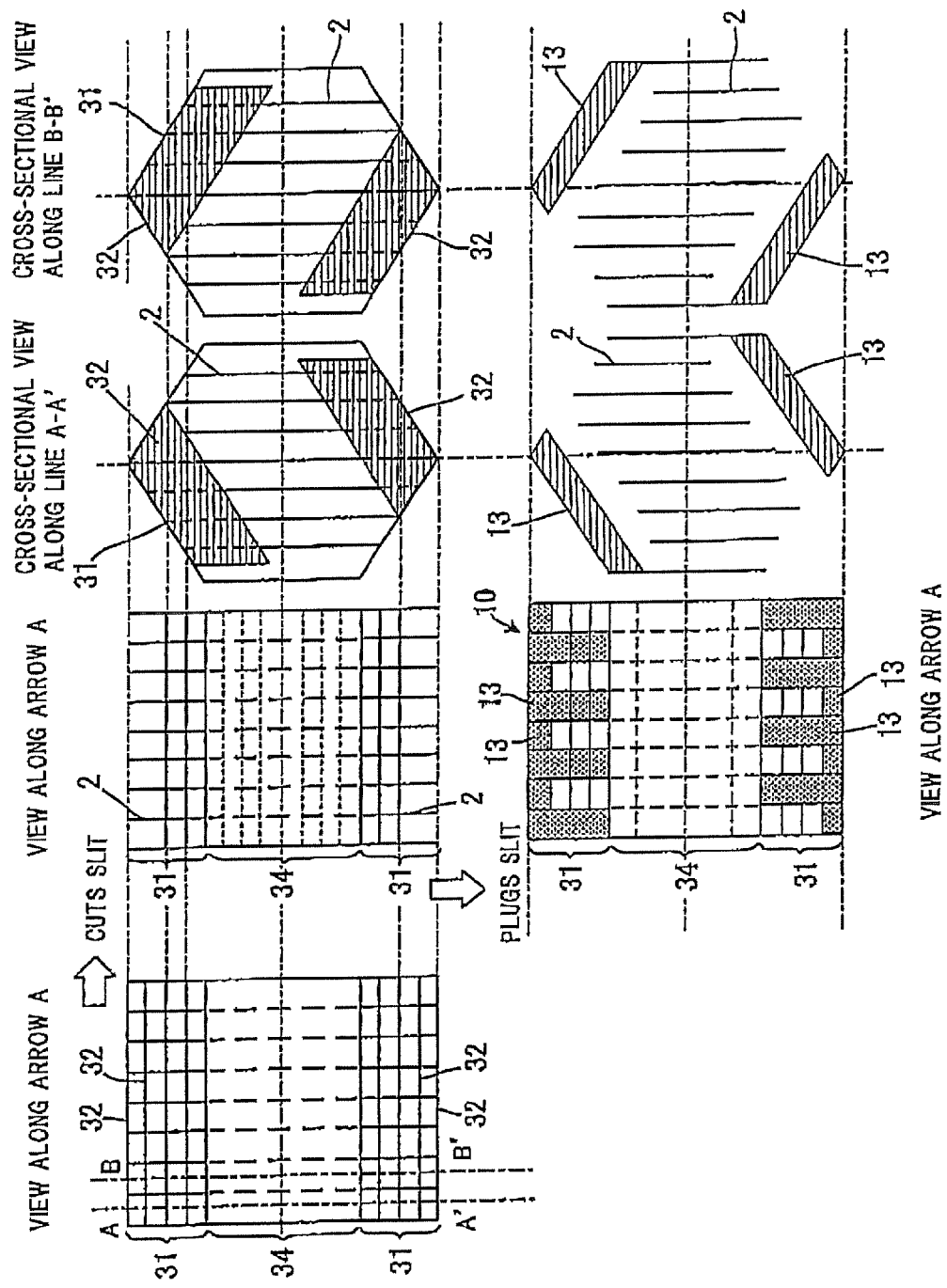
FIG. 6 is a view showing a honeycomb structure production process.
Figure 7:
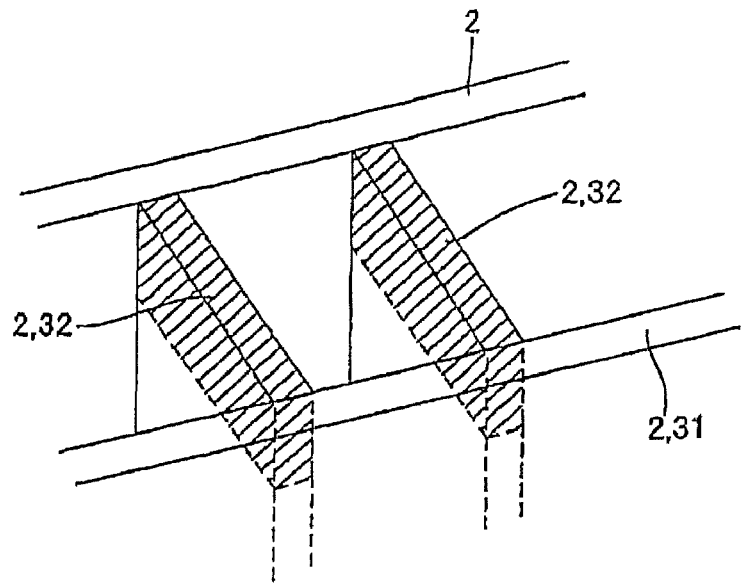
FIG. 7 is an illustrative diagram of a cut section of a partition wall.

The end of the partition wall 2 of the cell 3 in the plugged area is removed to a large extent as compared with the end of the partition wall 2 of the cell 3 in the unplugged area so that a gas circulation section is formed between the removed partition wall 2 and the plugging section 13 formed to be plugged (see FIGS. 6 and 7).

Since the gas circulation section is formed between the plugging section 13 and the partition wall 2 (see FIGS. 3A and 3B) so that the gas circulates from the gas inlet 11a or 12a into all of the cells 3 in the same direction, the gas can be caused to circulate in the cells 3 at a low pressure loss.

Figure 4B:
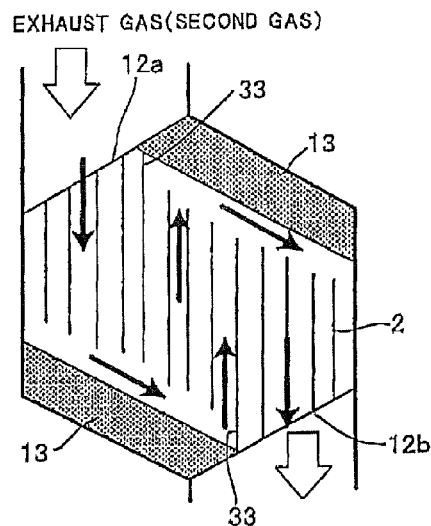
FIG. 4B is a schematic cross-sectional view showing a second gas circulation section according to another embodiment.

As shown in FIGS. 4A and 4B, a joint 33 is formed between the plugging section 13 and the partition wall 2 so that the gas flow direction can be caused to meander by the joint 33 to increase the length of the gas circulation path. Specifically, since the first gas circulation section 11 and the second gas circulation section 12, the joint 33 between the plugging section 13 and the partition wall 2 of the cell 3 is formed on the gas-inlet-side end of the plugging section 11 and the joint 33 between the plugging section 13 and the partition wall 2 of the cell 3 is formed on the gas-outlet-side end of the plugging section 13, the gas flow direction can be caused to meander to increase the length of the gas circulation path. This implements a heat-exchange structure that supplies a large amount of heat to the first gas from the second gas. Note that the formation position of the point 13 is not limited to the gas-inlet-side end and the gas-outlet-side end of the plugging section 13.

The honeycomb electrode 10 is preferably formed of a silicon carbide-containing conductive ceramic such as Si—SiC. The honeycomb electrode 10 preferably has a density of 2.5 to 3.5 g/cm$^3$, a thermal conductivity of 10 to 300 W/mK, and an electrical resistance of 0.05 to 0.2 Ω·cm. If the thermal conductivity is less than 10 W/mK, it may take time to activate a catalyst supported on the honeycomb electrode 10. If the thermal conductivity is more than 300 W/mK, heat radiation to the outside may increase so that a catalyst supported on the honeycomb electrode 10 may not be activated sufficiently. Note that Al-impregnated $Al_2O_3$ may also be used. A corrosion-resistant metal material such as an Fe—Cr—Al alloy may be used instead of the conductive ceramic. The honeycomb electrode 10 formed of such a material has heat resistance and durability, and functions as an electrode for discharging plasma between the honeycomb electrode 10 and the discharge electrode 20. Moreover, the honeycomb electrode 10 allows heat of the second gas that passes through the second gas circulation section 12 to be transmitted to the first gas circulation section 11 to promote a reaction of the first gas.

It is preferable that the plasma reactor 1 according to the present invention is provided with a catalyst that promotes a reaction. Specifically, it is preferable that a catalyst be supported on the first gas circulation section 11 of the honeycomb electrode 10 in order to promote the reaction of the first gas. It is also preferable that a catalyst be supported on the second gas circulation section 12 of the honeycomb electrode 10 in order to effectively utilize the reaction heat of the second gas. The catalyst is not particularly limited insofar as the catalyst has catalytic action with the heat-supplying gas and is a substance which shows an endothermic reaction. It is more preferable to use a substance that catalytic action is an exothermic reaction. For example, the catalyst may be a substance that contains at least one element selected from the group consisting of a precious metal (e.g., platinum, rhodium, palladium, ruthenium, indium, silver, and gold), aluminum, nickel, zirconium, titanium, cerium, cobalt, manganese, zinc, copper, tin, iron, niobium, magnesium, lanthanum, samarium, bismuth, and barium. A substance that contains the above-mentioned element may be a metal element, a metal oxide, other compounds (e.g., chloride and sulfate), or the like. These substances may be used either individually or in combination. It is preferable that the catalyst be supported on the wall of the reactor through which the gas passes. This improves reaction efficiency. Since the cells which functions as gas passages have a sufficient space, differing from a packed bed method in which the cells are filled with a particulate catalyst, passage of the gas is hindered to only a small extent. Since the catalyst component is supported on the honeycomb electrode 10, heat is sufficiently transferred between the catalyst components. Since the plasma reactor 1 according to the present invention utilizes a plasma reaction and a catalytic reaction, the amount of catalyst can be reduced. The plasma reactor 1 according to the present invention can be utilized as an inexpensive system due to a reduction in the amount of precious metal catalyst.

The amount of catalyst supported on the honeycomb electrode 10 is preferably 0.05 to 70 g/l, and more preferably 0.1 to 40 g/l. If the amount of catalyst supported on the honeycomb electrode 10 is less than 0.05 g/l, the catalyst may not exhibit catalytic action. If the amount of catalyst supported on the honeycomb electrode 10 is more than 70 g/l, the production cost of the plasma reactor may increase.

It is preferable that the catalyst be supported on the partition wall of the honeycomb electrode in the form of catalyst-coated particles (i.e., the catalyst is supported on carrier particles). This improves the reaction efficiency of the reforming target gas with the catalyst. As the carrier particles, a ceramic powder may be used, for example. The type of ceramic is not particularly limited. For example, a powder of a metal oxide such as silica, alumina, titania, zirconia, ceria, zeolite, mordenite, silica-alumina, a metal silicate, or cordierite may be suitably used. These ceramics may be used either individually or in combination. The catalyst can be supported on the partition wall of the honeycomb electrode by coating the partition wall of the honeycomb electrode with the catalyst-coated particles.

The average particle diameter of the powder is preferably 0.01 to 50 μm, and more preferably 0.1 to 20 μm. If the average particle diameter of the powder is less than 0.01 μm, the catalyst may not be sufficiently supported on the surface of the carrier particles. If the average particle diameter of the powder is more than 50 μm the catalyst-coated particles may be easily removed from the honeycomb electrode.

The mass ratio of the catalyst with respect to the carrier particle is preferably 0.1 to 20 mass %, and more preferably 1 to 10 mass %. If the mass ratio of the catalyst is less than 0.1 mass %, a reforming reaction may proceed to only a small extent. If the mass ratio of the catalyst is more than 20 mass %, the catalyst components may aggregate without being uniformly dispersed so that the catalyst may not be uniformly supported on the carrier particles. Therefore, even if the catalyst is added in an amount of more than 20 mass %, a catalyst addition effect corresponding to the amount may not be achieved so that a reforming reaction may not be promoted.

The catalyst-coated particles may be obtained by impregnating the ceramic powder (carrier particles) with an aqueous solution containing the catalyst component, and drying and firing the resulting product. The catalyst can be supported on the partition wall of the honeycomb electrode by adding a dispersion medium (e.g., water) and additives to the catalyst-coated particles to prepare a coating liquid (slurry), and coating the partition wall of the honeycomb electrode with the slurry.

Figure 5:
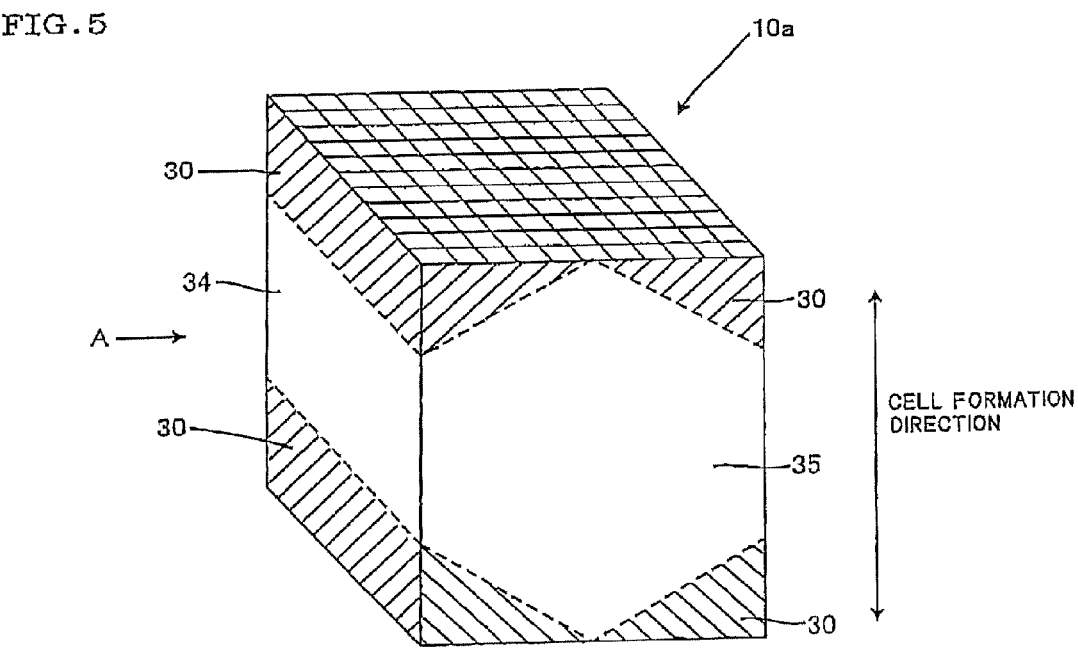
FIG. 5 is a perspective view showing one embodiment of a honeycomb structure.

A method of producing the honeycomb electrode 10 (e.g., honeycomb electrode hating hexagonal shape) is described below. A raw material such as a silicone carbide powder is mixed with a binder and water or an organic solvent to prepare a plastic clay. The clay is extruded to form a quadrangular prism-shaped honeycomb formed product hating a number of cells 3 that are partitioned by the partition wall 2 and formed in the axial direction, for example. The honeycomb formed product is dried using a microwave, a hot blast, or the like, and is then calcined to remove the binder and an organic pore-forming material. The resulting product is fired to produce a quadrangular prism-shaped honeycomb structure 10a shown in FIG. 5. A removal target section 30 (indicated by diagonal lines in FIG. 5) on each end in the cell extending direction (axial direction) is then removed. As a result, the first end and the second end are formed so that a ridge is formed at the center and the surface is inclined from the center to each side 34. A second side 35 adjacent to the side 34 forms a hexagon. Note that the honeycomb structure 10 may be integrally formed as shown in FIG. 5, or segments may be bonded to form the honeycomb structure 10. The production method may be appropriately selected according to the ease of processing.

A method of cutting the partition wall 2 and a method of forming the plugging section 13 are described below with reference to FIGS. 6 and 7. As shown in FIG. 6 (a view along the arrow A, a cross-sectional view along the line A-A', and a cross-sectional view along the line B-B' showing the honeycomb structure 10a shown in FIG. 5) and FIG. 7 (perspective view), a cut target section 32 on the end of the partition wall 2 in the cell row arrangement direction of a slope 31 is cut. Specifically, the end of the partition wall 2 of the cells 3 in the area plugged by forming the plugging section 13 is removed to a large extent as compared with the partition wall 2 of the cells 3 in the unplugged area. The first end and the second end of the first cell row and the first end and the second end of the second cell row are cut in this manner. The plugging section 13 is formed in the processing area (closed area) to form a honeycomb electrode 10 in which a gas circulation section is formed between the plugging section 13 and the partition wall 2 that has been removed. The honeycomb electrode 10 is provided with the plugging sections 13 at intervals of one cell row. Note that above-described production method also applies to the case where the plugging sections 13 are provided at intervals of two or more cell rows.

The discharge electrode 20 is described below. As shown in FIG. 1, the discharge electrode 20 is formed as a linear electrode using stainless steel. The discharge end of the discharge electrode 20 is formed in the shape of a needle. The discharge electrode may be formed to have a diameter of 0.1 to 5 mm and a length of 3 to 50 mm, for example. As the material for the discharge electrode, a corrosion-resistant conductive material containing Inconel or the like may be used instead of stainless steel. In addition, as a number of disposed linear electrode, it suffices that at least one linear electrode be disposed. A plurality of linear electrodes may be disposed. The linear electrode need not have a sharp needle-like end. The linear electrode may have a rod shape, a plate shape, or may be bent (e.g., a ring shape or a L-shape). The shape of the electrode is not particularly limited.

Figure 8:
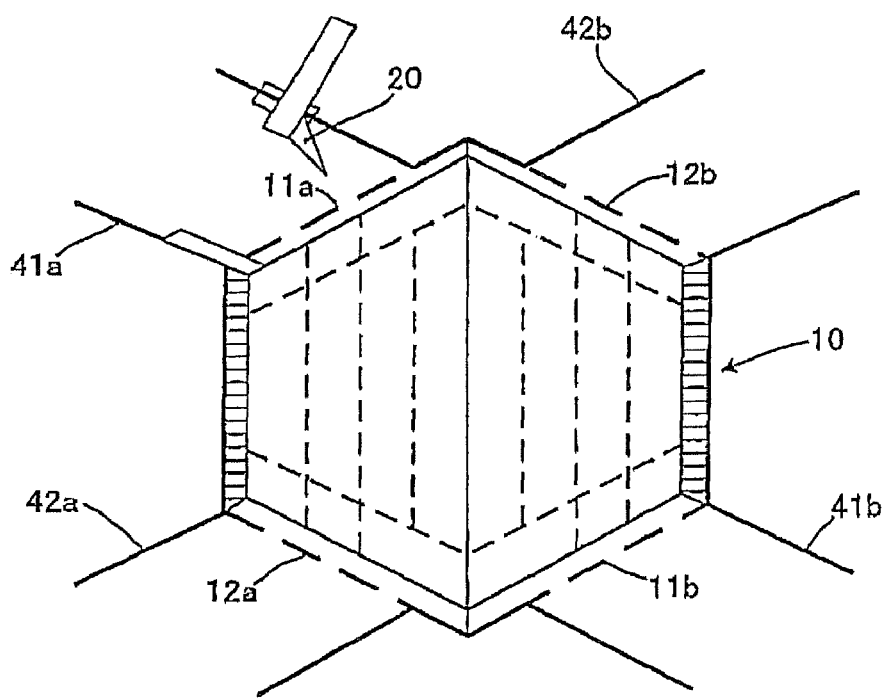
FIG. 8 is a schematic view showing one embodiment of the configuration of a linear electrode and a honeycomb electrode.

FIG. 8 shows a configuration example of the linear electrode (discharge electrode 20) and the honeycomb electrode 10 formed of silicon carbide (SiC). As shown in FIG. 8, the linear electrode (positive electrode) is disposed at a distance of 15 to 30 mm from the inlet-side end of the honeycomb electrode 10 (negative electrode). If the distance between the linear electrode (positive electrode) and the honeycomb electrode 10 is larger than 0 mm and less than 15 mm, the plasma generation area decreases although plasma discharge occurs between the electrodes. As a result, the reaction efficiency may decrease. Therefore, the distance between the linear electrode and the honeycomb electrode 10 is preferably 15 to 30 mm. If the distance between the linear electrode and the honeycomb electrode 10 is larger than 30 mm, plasma discharge may become unstable. Thus aforementioned range is preferable.

It is preferable that the linear electrode be formed of a highly conductive material such as a metal, an alloy, or a conductive ceramic from the viewpoint of ensuring conductivity. Examples of a highly conductive metal include stainless steel, nickel, copper, aluminum, iron, and the like. Examples of a highly conductive alloy include an aluminum-copper alloy, a titanium alloy, Inconel (trade name), and the like. Examples of a conductive ceramic include silicon carbide and the like. Examples of other materials include carbon and the like.

The gas inlet 11a and the gas outlet 11b of the first gas circulation section 11 on the slope 31 of the honeycomb electrode 10 are provided with a first inlet pipe 41a and a first discharge pipe 41b so that the first gas can be introduced into the honeycomb electrode 10 and reacted. The gas inlet 12a and the gas outlet 12b of the second gas circulation section 12 are provided with a second inlet pipe 42a and a second discharge pipe 42b so that the second gas can be introduced into the honeycomb electrode 10 to utilize heat of the second gas.

A plasma reaction apparatus may be formed by combining the plasma reactor 1 with a pulse power supply of which the pulse half-value width can be controlled to one microsecond or less. The pulse power supply refers to a power supply that applies a pulse voltage to a pair of electrodes. A power supply that cyclically applies a voltage may be used as the pulse power supply. It is preferable to use a power supply that can supply (a) a pulse waveform having a peak voltage of 1 kV or more and a pulse number per second of 1 or more, (b) an AC voltage waveform having a peak voltage of 1 kV or more and a frequency of 1 or more, (c) a DC waveform having a voltage of 1 kV or more, or (d) a voltage waveform formed by superimposing these waveforms. The peak voltage of the power supply is preferably 1 to 20 kV, and more preferably 5 to 10 kV. The pulse width (half-value width) is preferably about 50 to 300 ns. Examples of such a power supply include an inductive-energy-storage high-voltage pulse power supply utilizing a static induction thyristor (SI thyristor) and the like.

The plasma reactor 1 according to the present invention is a heat exchanger-integrated hybrid reactor. The heat exchanger integrated hybrid reactor refers to a structure in which a path for the first gas processed by plasma and a path for the second gas that supplies heat to efficiently process the first gas are independently formed and integrally stacked, and the gas inlet 11a and the gas outlet 11b for the first gas and the gas inlet 12a and the gas outlet 12b for the second gas are provided. A first gas circulation path from the gas inlet 11a to the gas outlet 11b and a second gas circulation path from the gas inlet 12a to the gas outlet 12b are independently provided. As shown in FIG. 8, the pipes 41a, 41b, 42a, and 42b connected to the gas inlet 11a and the gas outlet 11b for the first gas and the gas inlet 12a and the gas outlet 12b for the second gas are separated and shielded sufficiently so that the first gas and the second gas are not mixed. It is necessary that each pipe is hollow so that the gas passes through. For example, a cylindrical pipe, a rectangular pipe, or the like may be used. The size of the pipe may be appropriately determined depending on the application of the plasma reactor 1.

The materials for the outer housing, pipe, and the like of the plasma reactor 1 are not particularly limited. It is preferable to form the outer housing using a metal (e.g., stainless steel) with excellent workability. It is preferable that the electrode installation section inside the housing be formed of an insulating material from the viewpoint of preventing a short circuit. As the insulating material, a ceramic may be suitably used. As the ceramic, alumina, zirconia, silicon nitride, aluminum nitride, sialon, mullite, silica, cordierite, or the like is preferably used. An insulating mat may also be used other than aforementioned insulating materials. For example, a mullite fiber mat (trade name: "Maftec OBM" manufactured by Mitsubishi Chemical Functional Products Inc.) may be used.

When producing hydrogen using the plasma reactor 1 according to the present invention, the reforming target fuel is not particularly limited insofar as the reforming target fuel can produce a hydrogen-containing gas. For example, a hydrocarbon compound (e.g., a light hydrocarbon such as methane, propane, butane, heptane, or hexane, or a petroleum hydrocarbon such as isooctane, gasoline, kerosene, or naphtha) or an alcohol (e.g., methanol, ethanol, n-propanol, 2-propanol, and 1-butanol) may be used. A mixture of these compounds may also be used. As the reforming method, partial reforming that utilizes oxygen, steam reforming that utilizes water, autothermal reforming that utilizes oxygen and water, or the like may be used.

The plasma reactor 1 according to the present invention may be installed in an automobile or the like. Part of fuel (fuel-containing gas) is introduced as the first gas, and exhaust gas is introduced as the second gas. A reaction is promoted by utilizing heat of the exhaust gas to reform the fuel.

Figure 9:
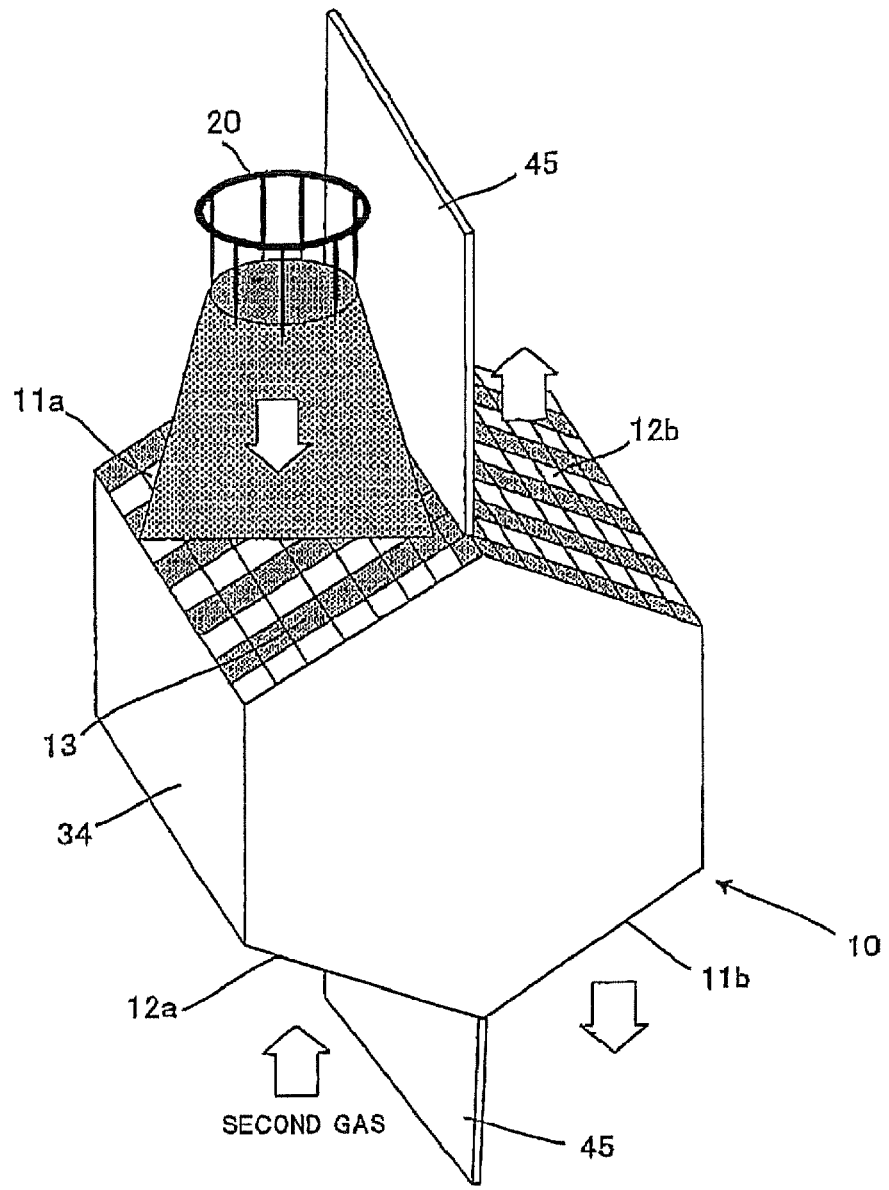
FIG. 9 is a schematic view showing an embodiment using an electrode formed by circularly arranging a plurality of needle-like electrodes.

As shown in FIG. 9, an electrode formed by circularly arranging a plurality of needle-like electrodes may be used as the discharge electrode 20. Plasma can be discharged in a wide space by disposing the needle-like electrodes at such a distance that the needle-like electrodes do not interfere. As a result, a large number of radicals can be produced so that the reaction efficiency can be improved.

FIGS. 10A and 10B show an embodiment of the honeycomb electrode 10 having an octagonal cross-sectional shape. FIG. 10B is a cross-sectional view along the line A-A' and a cross-sectional view along the line B-B' shown in FIG. 10A. The above embodiment has been described taking an example in which the honeycomb electrode 10 has a hexagonal cross-sectional shape. The honeycomb electrode 10 can be similarly formed to have an octagonal cross-sectional shape.

EXAMPLES

The present invention is further described below based on examples. Note that the present invention is not limited to the following examples.

Example 1

Production of Counter-Flow Heat Exchanger-Integrated Hybrid Honeycomb Reactor

A quadrangular prism-shaped honeycomb structure formed of silicon carbide (SiC) was cut in the shape of a hexagon (side length: 20 mm) (see FIG. 5). The left side of the first end (see FIG. 1) was removed by 5 mm at intervals of one cell (see FIG. 7). The groove was plugged with a plugging material to a depth of about 1.5 to 2 mm (see FIG. 6). The right side of the first end (see FIG. 1) was removed by 5 mm corresponding to the cells different from those of the left side of the first end. The groove was plugged with a plugging material to a depth of about 1.5 to 2 mm. The left side of the second end (see FIG. 1) was removed by 5 mm corresponding to the same cells as those of the right side of the first end. The groove was plugged with a plugging material to a depth of about 1.5 to 2 mm. The right side of the second end (see FIG. 1) was removed by 5 mm corresponding to the cells different from those of the left side of the second end. The groove was plugged with a plugging material to a depth of about 1.5 to 2 mm. A honeycomb electrode 10 was thus obtained. Silicon carbide used to form the honeycomb electrode was impregnated with Si and had a density of 3.0 g/cm$^3$, a thermal conductivity of 150 W/m·K, and an electrical resistance of 0.1 Ω·cm.

Example 2

Production of Counter-Flow Heat Exchanger-Integrated Catalyst-Supporting Hybrid Honeycomb Reactor Alumina fine powder (specific surface area: 107 m$^2$/g) was impregnated with a nickel nitrate (Ni(NO$_3$)$_2$) solution, dried at 120° C., and fired at 550° C. for three hours in air to obtain Ni/alumina powder containing nickel (Ni) in an amount of 10 mass % based on alumina. After the addition of alumina sol and water to the Ni/alumina powder, the pH of the mixture was adjusted to 4.0 using a nitric acid solution to obtain a slurry. A honeycomb electrode 10 similar to that of Example 1 was immersed in the slurry, dried at 120° C., and fired at 550° C. for one hour in a nitrogen atmosphere to obtain a counter-flow heat exchanger-integrated catalyst-supporting hybrid honeycomb reactor (plasma reactor 1). In the examples, the plasma reactor 1 was used as a negative electrode. The amount of Ni supported on the plasma reactor 1 was 25 g/l.

A plasma generation power supply (pulse power supply) was electrically connected to a linear electrode (positive electrode) (discharge electrode 20) and the counter-flow heat exchanger-integrated catalyst-supporting hybrid honeycomb reactor (negative electrode) (plasma reactor 1) through conductive lines.

Comparative Example 1

A plasma reactor utilizing a pair of linear electrodes was formed in the same manner as described above, except that a linear electrode similar to the discharge electrode 20 was provided instead of the honeycomb electrode 10 (negative electrode) formed of silicon carbide. An i-$C_8H_{18}$ reforming test was conducted under the same conditions as in the examples. The electrode-to-electrode distance was set at 15 mm. The plasma reactor was placed in an electric furnace instead of introducing exhaust gas into the plasma reactor. The heating temperature of the electric furnace was set so that the temperature of the reformed gas discharged from the plasma reactor was the same as that of the examples.

Comparative Example 2

The linear electrode serving as the negative electrode was provided with pellets (diameter: 2 mm, carrier; barium titanate ($BaTiO_3$)) in which an Ni/alumina catalyst was supported on the surface of particles in an amount of 10 mass %. The catalyst-supporting pellets were provided so that the amount of Ni supported on the surface of the pellets was the same as the amount of Ni employed in the example. The catalyst-supporting pellets were provided so that the end of the linear electrode (negative electrode) protruded by about 5 mm.

(Hydrocarbon Reforming Test)

A hydrocarbon reforming test was conducted using the heat exchanger-integrated hybrid honeycomb reactor of Example 1 and the heat exchanger-integrated catalyst-supporting hybrid honeycomb reactor of Example 2. Isooctane (i-$C_8H_{18}$) was used as the hydrocarbon. Reforming method was partial oxidation reaction of i-$C_8H_{18}$. Since i-$C_8H_{18}$ is liquid, a gas introduced into the reactor was heated to 290° C. in advance, and a specific amount of i-$C_8H_{18}$ was injected using a high-pressure microfeeder ("JP-H" manufactured by Furue Science K.K.) to vaporize i-$C_8H_{18}$. A fuel-containing model gas (first gas) contained 2000 ppm of i-$C_8H_{18}$ and 8000 ppm of $O_2$ with the balance being $N_2$ gas. The fuel-containing model gas was introduced into the fuel gas pipe of each reactor. The space velocity (SV) of the fuel-containing model gas was 80,000 $h^{-1}$ with respect to the plasma generation space of each reactor.

Air was used as exhaust model gas (second gas). The model gas was heated to 600° C. in advance, and introduced into the exhaust gas pipe of the silicon carbide honeycomb reactor. The space velocity (SV) of air was 80,000 $h^{-1}$ with respect to the exhaust gas passage space of each reactor. The fuel-containing model gas was introduced into each reactor, the amount of $T_2$ contained in the gas discharged from the plasma reactor was measured by a gas chromatography (GC) apparatus ("GC3200" manufactured by GL Sciences Inc., carrier gas: argon gas) equipped with a thermal conductivity detector (TCD), and the $H_2$ yield was calculated. The amount of ethane ($C_2H_6$) contained in the discharged model gas was measured using helium gas as the GC carrier gas. $C_2H_6$ is a by-product. A mixed reference gas ($H_2$ and $C_2H_6$) having a known concentration was used and measured in advance. The pulse power supply for generating plasma was set at a repetition cycle of 3 kHz. A peak voltage of 3 kV was applied between the electrodes.

$$H_2 \text{ yield}(\%) = H_2 \text{ production amount(ppm)}/i\text{-}C_8H_{18} \text{ amount(ppm) in model gas} \times 9 \quad (1)$$

A hydrogen production experiment was conducted under the same conditions using a reactor in which a catalyst was not supported. Table 1 shows the measurement results for reformed gas produced in Examples 1 and 2 and Comparative Examples 1 and 2.

TABLE 1

|  | Example 1 | Example 2 | Comparative Example 1 | Comparative Example 2 |
|---|---|---|---|---|
| H2 (%) | 41 | 54 | 17 | 28 |
| $C_2H_6$ concentration ratio | 1 | 0.2 | 2.4 | 1.6 |

When comparing Examples 1 and 2 with Comparative Examples 1 and 2, a high hydrogen production rate was achieved and production of by-products such as $C_2H_6$ was suppressed in Examples 1 and 2 as compared with Comparative Examples 1 and 2. When comparing Example 1 with Example 2, the hydrogen production rate achieved in Example 2 in which plasma discharge and the catalyst were combined was higher than the hydrogen production rate achieved in Example 1 in which only plasma discharge was used. The amount of by-products such as $C_2H_6$ produced in Example 2 was smaller than that of Example 1. These tendencies also were confirmed in the case of Comparative Examples 1 and 2. That is, the hydrogen production rate achieved in Comparative Example 2 in which plasma discharge and the catalyst were combined was higher than the hydrogen production rate achieved in Comparative Example 1 in which only plasma discharge was used, and the amount of by-products such as $C_2H_6$ produced in Comparative Example 2 was smaller than that of Comparative Example 1. It was confirmed from these results that hydrogen can be efficiently produced from i-$C_8H_{18}$ by combination of a plasma discharge and a catalyst.

The plasma reactor according to the present invention may be suitably used for a reforming reaction of a hydrocarbon compound or an alcohol, and particularly for a hydrogen production reaction. Since a large amount of reformed gas can be stably supplied for a long period of time, the plasma reactor according to the present invention may be suitably used for applications such as an on-vehicle fuel reformer that utilizes automotive exhaust gas to supply heat.

What is claimed is:
1. A plasma reactor comprising:
   a honeycomb electrode that is formed of a conductive material and functions as an electrode, a plurality of cells that function as gas passages and are partitioned by a partition wall being formed in the honeycomb electrode, the plurality of cells forming a first gas circulation section that allows a first gas to pass through, and a second gas circulation section that allows a second gas to pass through to supply heat of the second gas to the first gas circulation section to promote a reaction of the first gas; and a discharge electrode that is disposed to face the honeycomb electrode, a plasma discharge occurring between the discharge electrode and the honeycomb electrode so that the first gas undergoes a reaction, the first gas introduced into the first gas circulation section of the honeycomb electrode from a space between the discharge electrode and the honeycomb electrode being reacted by causing a plasma discharge between the honeycomb electrode and the discharge electrode, and the second gas being introduced into the second gas circulation section of the honeycomb electrode to transfer heat of the second gas to the first gas circulation section to promote the reaction of the first gas.

2. The plasma reactor according to claim 1, wherein a discharge end of the discharge electrode is in the shape of a needle or a rod.

3. The plasma reactor according to claim 1, wherein the conductive material that forms the honeycomb electrode includes a conductive ceramic.

4. The plasma reactor according to claim 3, wherein the conductive ceramic is a metal-ceramic composite material.

5. The plasma reactor according to claim 3, wherein the conductive ceramic includes silicon carbide.

6. The plasma reactor according to claim 1, wherein the honeycomb electrode has a thermal conductivity of 10 to 300 W/mK.

7. The plasma reactor according to claim 1, wherein:
the first gas circulation section corresponds to a first cell row formed by a plurality of cells arranged in one direction;
the second gas circulation section corresponds to a second cell row formed by a plurality of cells arranged in parallel to the first cell row; and
the first gas circulation section and the second gas circulation section are alternately provided by the cell rows.

8. The plasma reactor according to claim 1, wherein:
a gas inlet of the first gas circulation section is provided on a first end of the honeycomb electrode on the side of the discharge electrode in a cell extending direction, and a gas outlet of the first gas circulation section is provided on a second end of the honeycomb electrode opposite to the side of the discharge electrode in the cell extending direction; and
a gas inlet of the second gas circulation section is provided on the second end of the honeycomb electrode, and a gas outlet of the second gas circulation section is provided on the first end of the honeycomb electrode.

9. The plasma reactor according to claim 8, wherein:
the gas inlet of the first gas circulation section and the gas inlet of the second gas circulation section are provided at opposed positions in the cell extending direction;
the gas outlet of the first gas circulation section and the gas outlet of the second gas circulation section are provided at opposed positions in the cell extending direction; and
the first gas and the second gas are crossed and circulated through different cell rows.

10. The plasma reactor according to claim 8, wherein:
a given area of the first cell row on the first end is plugged to form the gas inlet in the remaining area, and an area of the second end opposed to the remaining area of the first end is plugged to form the gas outlet in an area opposed to the given area of the first end; and
a given area of the second cell row on the second end is plugged to form the gas inlet in the remaining area, and an area of the first end opposite to the remaining area of the second end is plugged to form the gas outlet in an area opposed to the given area of the second end.

11. The plasma reactor according to claim 10, wherein an end of the partition wall of the cell in the plugged area is removed to a large extent as compared with the partition wall of the cell in the unplugged area so that a gas circulation section is formed between the removed partition wall and a plugging section formed to be plugged.

12. The plasma reactor according to claim 11, wherein a joint is formed between the plugging section and the partition wall so that a gas flow direction is caused to meander to increase a length of a gas circulation path.

13. The plasma reactor according to claim 1, wherein a catalyst is supported on the first gas circulation section of the honeycomb electrode.

14. The plasma reactor according to claim 1, wherein a catalyst is supported on the second gas circulation section of the honeycomb electrode.

15. The plasma reactor according to claim 13, wherein the catalyst is a substance that contains at least one element selected from the group consisting of a precious metal, aluminum, nickel, zirconium, titanium, cerium, cobalt, manganese, zinc, copper, tin, iron, niobium, magnesium, lanthanum, samarium, bismuth, and barium.

16. The plasma reactor according to claim 13, wherein the catalyst is a substance that contains at least one element selected from the group consisting of a precious metal, aluminum, nickel, zirconium, titanium, cerium, cobalt, manganese, zinc, copper, tin, iron, niobium, magnesium, lanthanum, samarium, bismuth, and barium.

17. The plasma reactor according to claim 15, wherein the precious metal is at least one element selected from the group consisting of platinum, rhodium, palladium, ruthenium, indium, silver, and gold.

18. The plasma reactor according to claim 16, wherein the precious metal is at least one element selected from the group consisting of platinum, rhodium, palladium, ruthenium, indium, silver, and gold.

19. A plasma reaction apparatus comprising the plasma reactor according to claim 1, and a pulse power supply of which the pulse half-value width can be controlled to one microsecond or less.

* * * * *